(12) United States Patent
Chen et al.

(10) Patent No.: US 11,360,673 B2
(45) Date of Patent: Jun. 14, 2022

(54) REMOVABLE DATA VOLUME MANAGEMENT

(71) Applicant: Red Hat, Inc., Raleigh, NC (US)

(72) Inventors: Huamin Chen, Raleigh, NC (US);
Stephen Watt, Raleigh, NC (US);
James R. Curtis, Raleigh, NC (US)

(73) Assignee: RED HAT, INC., Raleigh, NC (US)

( * ) Notice: Subject to any disclaimer, the term of this patent is extended or adjusted under 35 U.S.C. 154(b) by 984 days.

(21) Appl. No.: 15/056,709

(22) Filed: Feb. 29, 2016

(65) Prior Publication Data

US 2017/0249351 A1    Aug. 31, 2017

(51) Int. Cl.
*G06F 3/06* (2006.01)
*G06F 16/16* (2019.01)
*G06F 16/11* (2019.01)

(52) U.S. Cl.
CPC .......... *G06F 3/0619* (2013.01); *G06F 3/0689* (2013.01); *G06F 16/11* (2019.01); *G06F 16/168* (2019.01)

(58) Field of Classification Search
CPC ................. G06F 3/0619; G06F 3/0689; G06F 17/30058; G06F 17/3007; G06F 17/30126; G06F 16/168; G06F 16/11
USPC ......................................................... 707/627
See application file for complete search history.

(56) References Cited

U.S. PATENT DOCUMENTS

| 7,702,866 B2 | 4/2010 | Beardsley et al. |
| 7,730,205 B2 | 6/2010 | Rothman et al. |
| 8,209,544 B2 | 6/2012 | Maheshwari et al. |
| 8,505,069 B1 * | 8/2013 | Solodovnikov ........... G06F 8/65 726/1 |
| 8,560,775 B1 * | 10/2013 | McDuffee ............. G06F 3/0683 711/114 |

(Continued)

FOREIGN PATENT DOCUMENTS

CN    2014155609    4/2014

OTHER PUBLICATIONS

Red hat, Inc., "Red hat Enterprise Linux 5 5.11 Technical Notes," 2015, https://access.redhat.com/documentation/enUS/Red_Hat_Enterprise_Linux/5/pdf/5.11_Technical_Notes/Red_Hat_Enterprise_Linux-5-5.11_Technical_Notes-en-US.pdf , 257 pgs.

(Continued)

*Primary Examiner* — Ashish Thomas
*Assistant Examiner* — Abdullah A Daud
(74) *Attorney, Agent, or Firm* — Haynes and Boone, LLP (57) ABSTRACT

A method performed by a computing system includes detecting that a removable data volume has been attached to the computing system, the removable data volume being identified by a unique label. The method further includes, in response to determining that a portion of the unique label matches a predefined value, invoking a catalog container based on a rule within a first rule database. The method further includes, with the catalog container, obtaining metadata stored on the removable data volume, the metadata including characteristics of a first application associated with a first piece of data that is stored on the removable data volume. The method further includes, with the catalog container, creating an application container having the first application with the characteristics. The method further includes, with the application container, processing the removable data volume.

19 Claims, 5 Drawing Sheets

(56) References Cited

U.S. PATENT DOCUMENTS

| | | | |
|---|---|---|---|
| 8,612,547 B1* | 12/2013 | Dayan | G06F 9/455 |
| | | | 709/219 |
| 8,862,833 B2 | 10/2014 | Noll et al. | |
| 8,868,666 B1 | 10/2014 | Hellwege et al. | |
| 9,129,138 B1* | 9/2015 | Hesselink | G06F 21/6209 |
| 9,171,003 B2* | 10/2015 | Ravipati | G06F 16/14 |
| 9,844,023 B2* | 12/2017 | Nguyen | H04N 21/42203 |
| 10,089,676 B1* | 10/2018 | Gupta | G06Q 30/0633 |
| 2004/0073912 A1* | 4/2004 | Meza | G06F 16/258 |
| | | | 719/321 |
| 2006/0130004 A1* | 6/2006 | Hughes | G06F 9/44584 |
| | | | 717/131 |
| 2006/0288081 A1* | 12/2006 | Sung | G11B 27/002 |
| | | | 709/217 |
| 2007/0067566 A1* | 3/2007 | Ho | G11C 7/20 |
| | | | 711/115 |
| 2009/0094415 A1* | 4/2009 | Sugar | G06F 3/0632 |
| | | | 711/114 |
| 2010/0325644 A1* | 12/2010 | van der Linden | G06F 9/4411 |
| | | | 719/327 |
| 2011/0219184 A1* | 9/2011 | Jaquette | G06F 3/0682 |
| | | | 711/111 |
| 2012/0005237 A1* | 1/2012 | Obata | G06F 9/45537 |
| | | | 707/798 |
| 2012/0023194 A1* | 1/2012 | Ruiz-Velasco | H04L 67/34 |
| | | | 709/217 |
| 2012/0322470 A1* | 12/2012 | Said | G06Q 10/107 |
| | | | 455/466 |
| 2013/0084932 A1* | 4/2013 | Nelson | G07F 17/3241 |
| | | | 463/16 |
| 2014/0047413 A1* | 2/2014 | Sheive | G06F 8/30 |
| | | | 717/110 |
| 2014/0181004 A1* | 6/2014 | Said | G06F 16/254 |
| | | | 707/602 |
| 2014/0373032 A1* | 12/2014 | Merry | G06F 9/4843 |
| | | | 719/328 |
| 2016/0027198 A1* | 1/2016 | Terry | G06F 16/00 |
| | | | 345/473 |
| 2016/0132808 A1* | 5/2016 | To | G06Q 10/06315 |
| | | | 705/7.25 |

OTHER PUBLICATIONS

Daemon, https://docs.docket.com/engine/reference/commandline/daemon/.

* cited by examiner

REMOVABLE DATA VOLUME MANAGEMENT

BACKGROUND

The present disclosure relates generally to computer storage systems, and more particularly to methods and systems for managing data stored on removable data volumes.

Computer systems regularly store data in the form of files on storage systems associated with such computer systems. One example of such a storage system is a removable data volume. A removable data volume may store files that are formatted to be accessed by a specific application, or even a specific version of such applications. When the removable data volume is attached to a computing system, it is not guaranteed that the computing system will have the software that is needed to correctly access the files stored on the removable data volume. Even if the computing system has the appropriate software, it may not have the correct version or specific software package that is needed to correctly access those files. It is desirable that data on a removable data volume be correctly processed in a trusted runtime environment when that removable data volume is attached to a particular computing system.

SUMMARY

According to one example, a method performed by a computing system includes detecting that a removable data volume has been attached to the computing system, the removable data volume being identified by a unique label. The method further includes, in response to determining that a portion of the unique label matches a predefined value, invoking a catalog container based on a rule. The method further includes, with the catalog container, obtaining metadata stored on the removable data volume, the metadata including characteristics of a first application associated with a first piece of data that is stored on the removable data volume. The method further includes, with the catalog container, causing an application container having the first application with the characteristics to be loaded. The method further includes, with the application container, processing the removable data volume.

A computing system includes a processor and a memory comprising machine readable instructions that when executed by the processor cause the processor to detect that a removable data volume has been attached to the computing system, the removable data volume being identified by a unique label. The machine readable instructions further cause the system to, in response to determining that a portion of the unique label matches a predefined value and invoke a catalog container based on a rule within a first rule database. The machine readable instructions further cause the system to, with the catalog container, obtain metadata stored on the removable data volume, the metadata including characteristics of a first application associated with a first piece of data that is stored on the removable data volume. The machine readable instructions further cause the system to, with the catalog container, create an application container having the first application with the characteristics. The machine readable instructions further cause the system to, with the application container, process the removable data volume.

According to one example, a method performed by a computing system includes detecting that a first removable data volume has been connected to the computing system. The method further includes, in response to detecting that a label of the first removable data volume triggers a rule, looking up the label in a rule database, the rule database referencing a catalog container. The method further includes, loading the catalog container from a public container database. The method further includes, with the catalog container, reading metadata stored on the first removable data volume, the metadata indicating at least one application and a first set of characteristics for the at least one application associated with at least one piece of data on the first removable data volume. The method further includes, loading a first application container to process the first removable data volume, the first application container including the at least one application having the first set of characteristics.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

As described above, it is desirable that data on a removable data volume be correctly processed in a trusted runtime environment when that removable data volume is attached to a particular computing system. According to principles described herein, when a removable data volume is attached to a computing system, a container that has the appropriate software is used to process the removable data volume. Containers are a virtualization mechanism by which the kernel of the operating system provides multiple, isolated, user-spaces. Different containers running on the same physical computing system may run various pieces of software and in some cases may run various versions of the same piece of software. According to the present disclosure, providing the appropriate container to process the removable data volume involves a variety of elements such as metadata on the removable data volume, a container registry, and a rule database, all of which will be described in further detail below.

In one example, a computing system first detects that a removable data volume has been attached. The operating system of the computing system then examines the label of the removable data volume. If at least a portion of the label matches a predefined value (e.g., if the first three characters are "123"), this triggers an action to look up the label in a rule database. The rule database associates removable data volume labels with an action to invoke a catalog container. The catalog container includes an application that looks at metadata stored on the removable data volume. The metadata indicates one or more software applications that are to be used to process the data stored on the removable data volume. The metadata may include the name of the software, the version number of the software, the system requirements of the software, and other information. Using the metadata information, the catalog container then searches for a container that has the appropriate configuration to process the removable data volume. This container will be referred to as the application container. The application container includes the appropriate software associated with the data stored on the removable data volume. The computing system can then create a runtime environment and invoke the application container to process the removable data volume.

Figure 1:
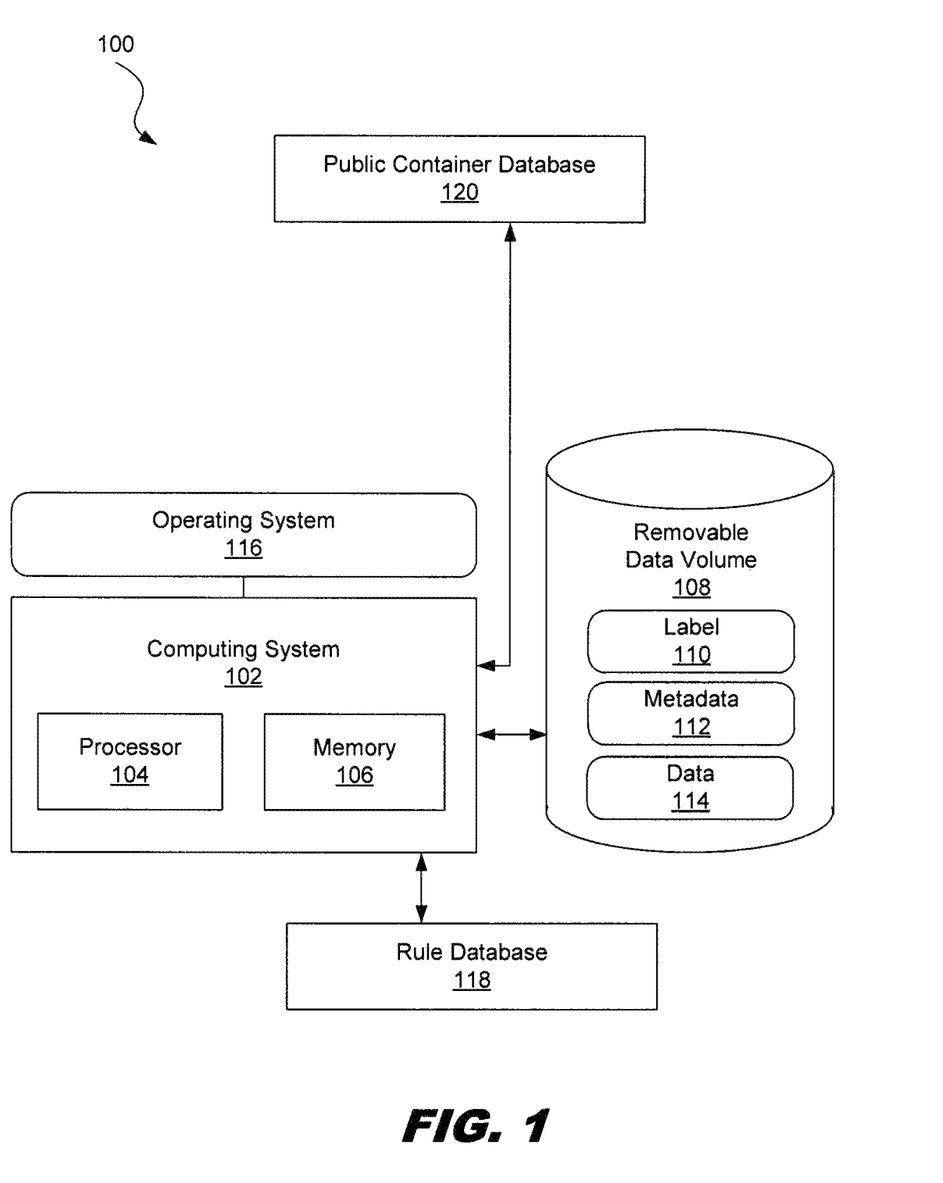
FIG. 1 is a flowchart showing an illustrative system for processing data on a removable data volume, according to one example of principles described herein.

FIG. 1 is a diagram showing an illustrative system 100 for processing data on a removable data volume. According to the present example, the computing system 102 includes a processor 104 and a memory 106. The computing system 102 is in communication with a rule database 118 and a public container database 120. The computing system 102 may also have a removable data volume 108 connected thereto.

The operating system 116 controls access to the physical resources (e.g., processor 104 and memory 106) of the computing system. In other words, the operating system 116 provides applications running on the computing system with access to the physical resources. The operating system 116 may also manage various containers. As mentioned above, a container is a virtualization mechanism that represents an isolated user-space.

The operating system 116, may also manage devices that are connected to the computing system 102. Such devices may include the removable data volume 108. The kernel of the operating system 116 may include a kernel device manager such as udev. The device manager listens to events triggered by a new device being added or a device being removed. The device manager may utilize a set of device manager rules that match against values of the events triggered by adding and removing devices. A matching device manager rule may, for example, name and create a device node. A device manager rule may, for example, run configured programs to set up and configure the device. Device manager rules can match on properties like the kernel subsystem, the kernel device name, the physical location of the device, or properties like the device's serial number. Device manager rules can also request information from external programs to name a device or specify a custom name that will always be the same, regardless of the order devices are discovered by the system.

In some examples, some of the device manager rules may be stored externally on a device manager rule database 118. Such a rule database may also be in communication with other physical systems. In some examples, the rule database 118, or an updated copy thereof, may be stored locally on the memory 106 of the physical computing system 102.

In some examples, a rule within the rule database 118 may invoke a container stored in a public container database 120. The public container database 120 may include a variety of containers for various purposes. Such containers may be transferred over a network to the computing system 102. The operating system 116 may then load such containers. The containers may have various programs installed thereon.

In one example, a developer stores data 114 on a removable data volume 108. To allow for increased mobility of the data stored 114 stored on the removable data volume 108, the developer also creates a catalog container and an application container, which will be described in further detail below. These containers may then be published in the public container database 120. Additionally, the developer may create a set of rules that under certain conditions will cause the catalog container to be invoked. Such rules may then be published in the rule database 118. The developer may also provide a unique label 110 to the removable data volume. The label 110 may trigger the rules stored in the rule database 118. The developer may also create metadata 112 that can be used by the catalog container to find the appropriate application container to process the removable storage volume.

Figure 2:
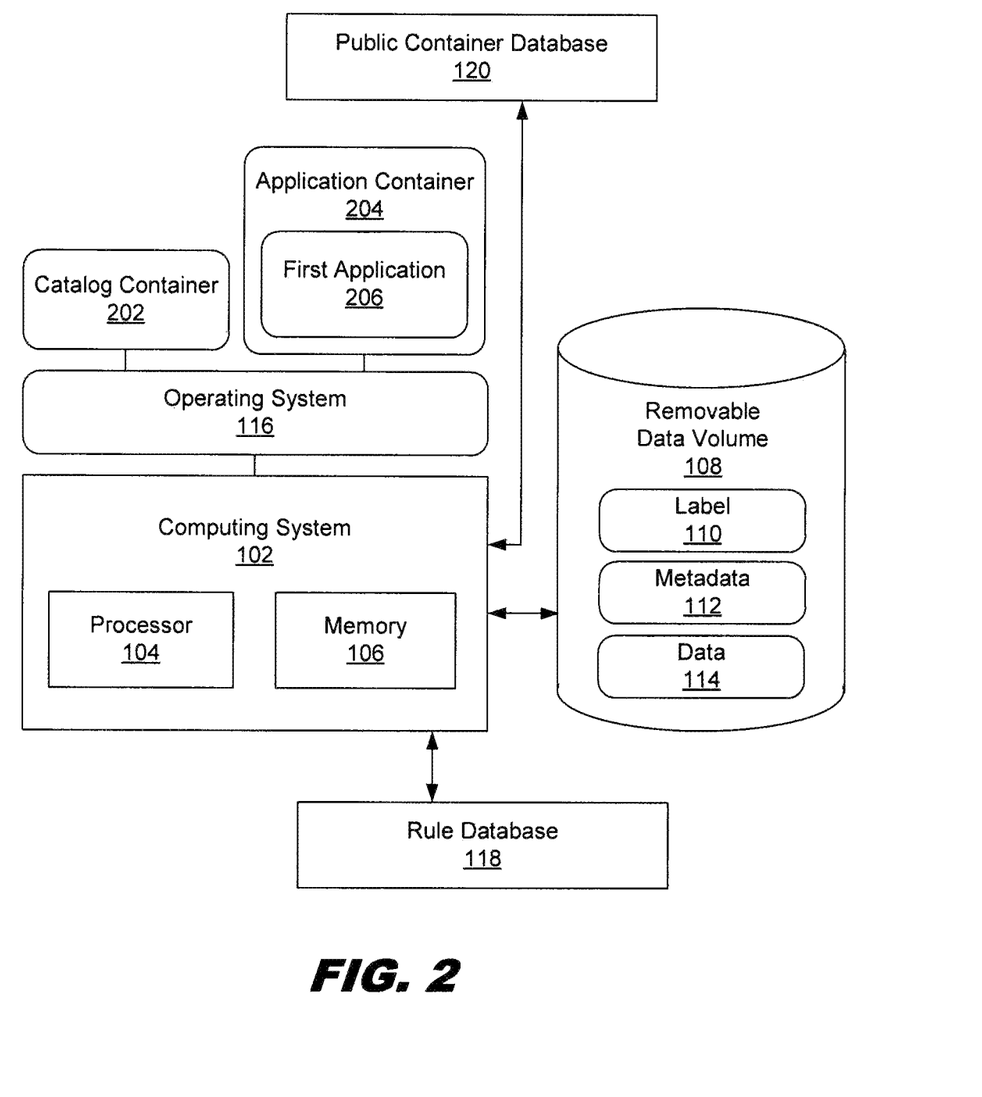
FIG. 2 is a diagram showing illustrative containers used to process data on the removable data volume, according to one example of principles described herein.

FIG. 2 is a diagram showing illustrative containers 202, 204 used to process data 114 on the removable data volume 108. According to one example, the removable data volume 108 becomes attached to the computing system 102. In one example, the removable data volume 108 is a physical device that is physically connected to the computing system 102. For example, the removable data volume 108 may be a universal serial bus (USB) device. In a further example, the removable data volume 108 may be an external hard drive that is connected to the computing system 102. In some examples, the removable data volume is a virtual volume. Such a virtual volume may be transferred to the memory 106 of the computing system and then attached to the computing system in a manner similar to that of a physical device.

According to principles described herein, the label 110 of the removable data volume 108 uniquely identifies the removable data volume 108. The label 110 may be, for example, a unique character string. Additionally, a portion of that unique character string is designed to trigger a device manager rule. For example, the first three characters of the label may be a predetermined value such as "123". Different labels may uniquely identify different removable data volumes while also including the value that triggers the rule. For example, one removable data volume may have a label of "123HTYCN" while another removable data volume may have a label of "123ARBFC". When the operating system detects that the set of first three characters triggers the rule, the device manager of the operating system 116 may look up the label 110 of the removable data volume 108 in the rule database 118.

The appropriate rule from the rule database 118 will cause the computing system 102 to invoke a catalog container 202 from the public container database 120. For example, the developer who assigned the label 110 to the removable data volume 108 may have also placed the appropriate rule within the rule database 118 to cause the computing system 102 to invoke the catalog container. The catalog container may include the appropriate software to look at the metadata 112 of the removable data volume. Based on the metadata of the removable data volume 108, the catalog container 202 then searches the public container database 120 for the appropriate container to process the data 114 on the removable data volume 108.

The metadata may indicate a variety of characteristics associated with the application to be used to access the data 114 stored on the removable data volume 108. In one example, the characteristic is simply the name of the application. This may include a commercially used name of the application or the name of the executable file for the application. In some examples, the metadata 112 includes a version number of a software package identifier. In some examples, the metadata 112 includes the preferred or the required runtime environment for the application. The runtime environment may include state variables that are accessible to the application during runtime. The runtime environment may also include other environmental variables that indicate other resources and devices available to the application during execution. The metadata 112 may also include the type and amount of resources required by the application. For example, the application may require a certain amount of hard disk space and a certain amount of volatile memory. The application may also require a certain amount of processor time. Other pieces of information which may be useful to the catalog container are contemplated as well. Using the information within the metadata 112, the catalog container 202 finds the application container 204, which may be available within the public container database 120.

The application container 204 is then invoked. The application container 204 includes a first application 206 that is associated with the data 114 on the removable data volume 108. The first application 206 includes all the characteristics indicated in the metadata. Additionally, the runtime environment provided to the application container 204 matches that indicated in the metadata 112. Thus, the first application 206 is the appropriate application in the appropriate configuration to correctly process the data 114. Various applications often format data in a proprietary manner such that only that application can correctly process the data. Moreover, sometimes various versions of that application have different features such that data created from older versions of the application may not be fully compatible with newer versions of the application. Conversely, data from newer versions may not be fully compatible with older versions of the application. Thus, the metadata 112 may indicate the version of the first application 206 as well as the name of the first application. There may be other containers within the public container database that include different versions of the first application 206.

In some examples, the data 114 include multiple files designed for use by multiple different applications. In such case, the application container 204 may include each of the applications that are needed to process each of the different types of files stored on the removable data volume 108.

In some examples, the application container 204 may act as a catalog container and find an additional application container to perform a specified function. For example, if the data 114 is encrypted in a particular manner, which is indicated by the metadata 112, then the application container 204 may cause the additional application container to be loaded. The additional application container may also be available in the public container database 120. The additional application container may include containerized software for decrypting the data 114. In some examples, multiple iterations of such a nested configuration may be used.

Figure 3:
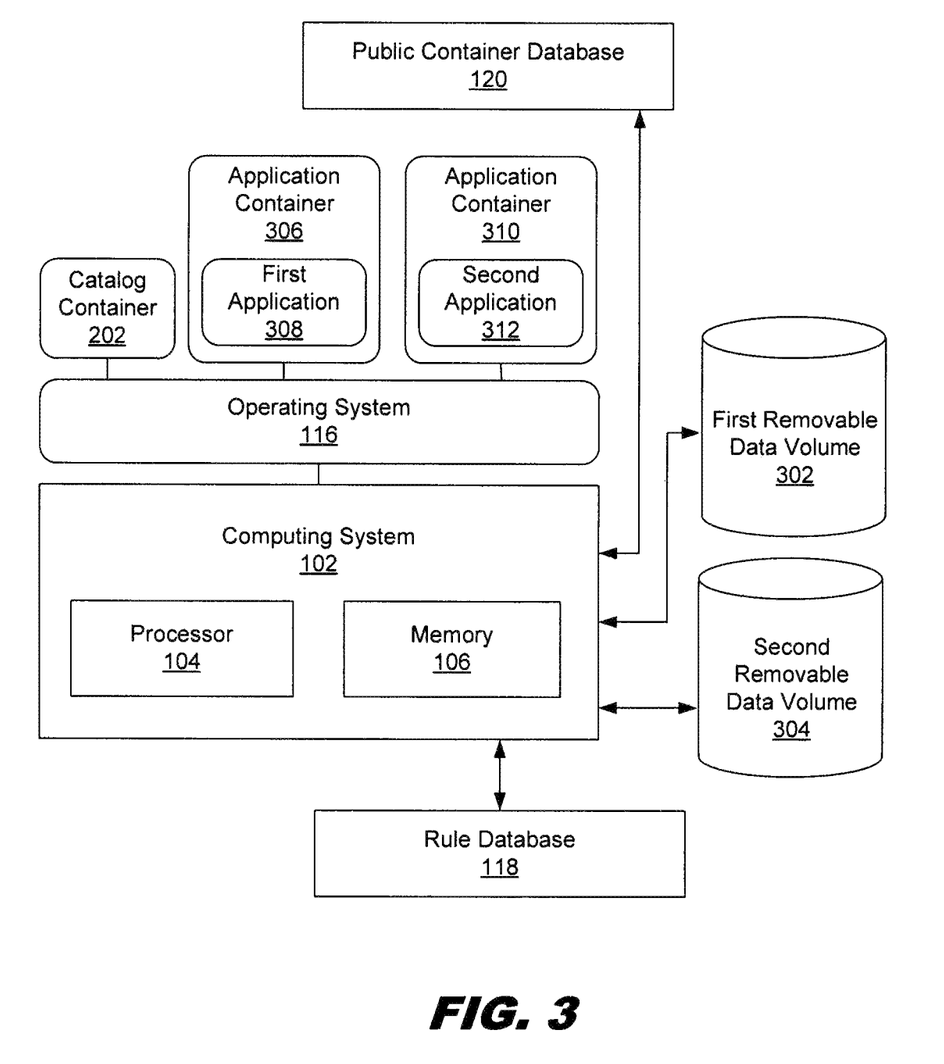
FIG. 3 is a diagram showing multiple data volumes and multiple containers, according to one example of principles described herein.

FIG. 3 is a diagram showing multiple data volumes and multiple containers. According to the present example, both a first removable data volume 302 and a second removable data volume 304 are connected to the computing system 102. Both removable data volumes 302, 304 are identified by a unique label (e.g., 110, FIG. 1). Additionally, both removable data volumes 302, 304 include metadata (e.g., 112, FIG. 1) that provides information to the catalog container 202 so that the catalog container 202 can find the appropriate application containers 306, 310 for the respective removable data volumes 302, 304.

Because the different data volumes may have different data (e.g., 114, FIG. 1) stored thereon, they may require different applications to process their respective data. Thus, the catalog container finds a first application container 306 that has a first application 308 for the data on the first removable data volume 302. Additionally, the catalog container 202 finds a second application container 310 that has a second application 312 for the data on the second removable data volume 304.

Figure 4:
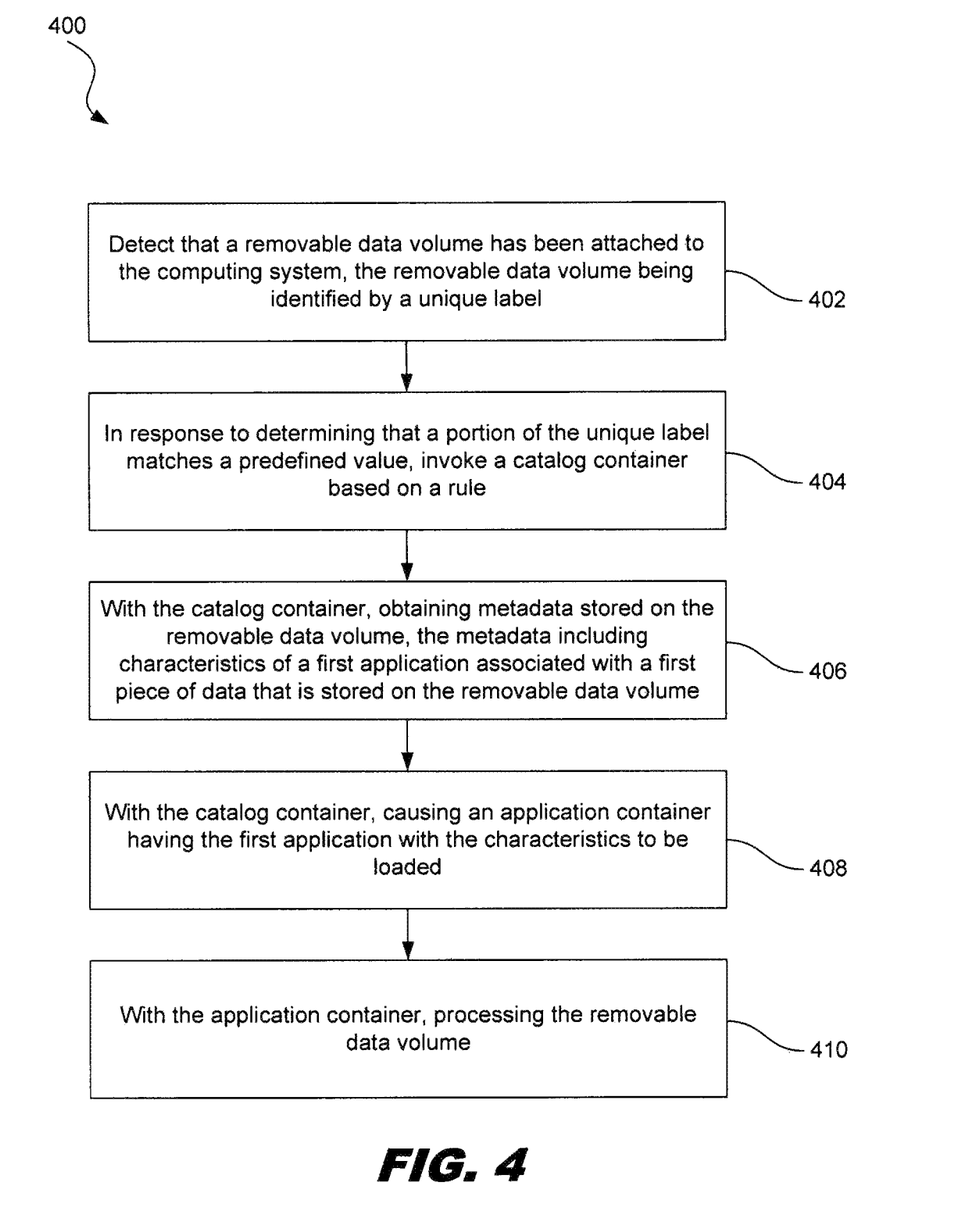
FIG. 4 is a flowchart showing an illustrative method for managing removable data volumes, according to one example of principles described herein.

FIG. 4 is a flowchart showing an illustrative method for managing removable data volumes. According to the present example, the method 400 includes a step 402 for detecting that a removable data volume has been attached to the computing system. The removable data volume may be a physical or virtual data volume. The removable data volume has a label that uniquely identifies the removable data volume. Additionally, the removable data volume includes data that is formatted to be accessed by at least one particular application. The removable data volume further includes metadata that identifies various characteristics of that particular application. For example, the metadata may indicate the name of the application. The metadata may also include the version of the application. The version may be identified, for example, by a version number. The metadata may also include the configuration of the runtime environment to be used with the application. The metadata may also indicate the type and amount of resources that are required by the application.

The method 400 further includes a step 404 for, in response to determining that a portion of the label matches a predefined value, invoking a catalog container based on a device manager rule. In one example, if the label of the removable data volume triggers the device manager rule, the operating system searches a rule database for the rule associated with the label. The rule within the rule database identifies the catalog container, which can be downloaded from the public container database. The catalog container can then be loaded by the operating system.

The method 400 further includes a step 406 for, with the catalog container, obtaining the metadata stored on the removable data volume. As mentioned above, the metadata includes characteristics of a first application associated with a first piece of data that is stored on the removable data volume. The piece of data may be, for example, a file.

The method 400 further includes a step 408 for, with the catalog container, causing an application container having the first application with the characteristics to be loaded. For example, the catalog container uses the information contained within the metadata to search the public container database for an appropriate application container. The appropriate application container includes the software matching the characteristics identified by the metadata. The application container can then be loaded.

The method 400 further includes a step 410 for, with the application container, processing the removable data volume. Because the application container includes containerized software for processing the removable data, the application container includes all the appropriate executables to access the files stored on the removable data volume. Moreover, the application container can be loaded in a runtime environment having characteristics identified by the metadata.

Using principles described herein, software developers can ensure that removable data volumes are handled consistently across servers. Specifically, because a particular removable data volume is associated with a particular device manager rule, such as a udev rule, any server using that udev rule can properly invoke the catalog container. The catalog container can then, in turn, cause the proper containerized software to be loaded.

Additionally, the catalog container may be a self-contained device manager rule processor. Thus, the catalog container can be used by various servers, which may run various operating systems. Specifically, the catalog container can be quickly downloaded from the public container database on demand. The catalog container can also be updated remotely. The catalog container can also be synchronized on the target operating system. Additionally, both the catalog container, and the application container, may be stateless so that they can run multiple instances on different data volumes without causing data privacy or integrity issues.

Figure 5:
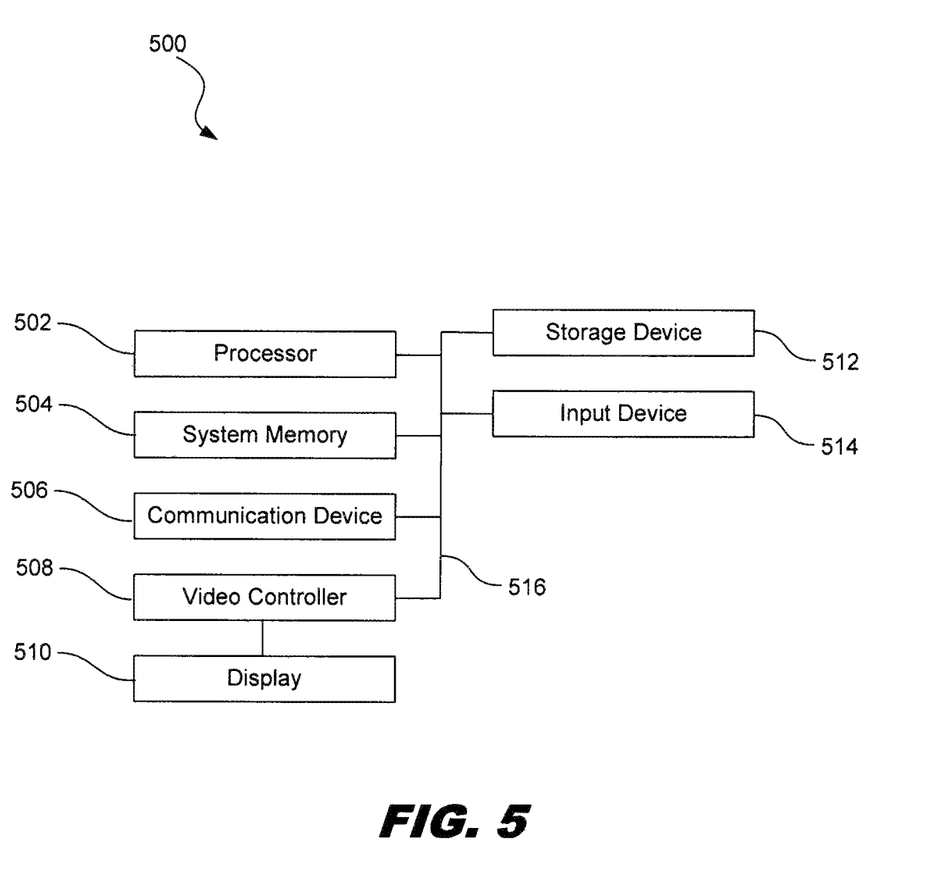
FIG. 5 is a diagram showing an illustrative computing system that may be used to manage removable data volumes, according to one example of principles described herein.

FIG. 5 is a diagram showing an illustrative computing system 500 that may be used to manage removable data volumes. In one example, the computing system 500 may be the computing system to which a removable data volume is attached. In one example, the computing system 500 may be a server hosting either the public container database or the rule database. According to the present example, the computing system 500 includes a processor 502, an input device 514, a storage device 512, a video controller 508, a system memory 504, a display 510, and a communication device 506, all of which are interconnected by one or more buses 516.

The storage device 512 may include a computer readable medium that can store data. The storage device 512 may include volatile memory storage devices such as Random Access Memory (RAM) as well as non-volatile memory storage devices such as solid state memory components. The computer readable medium may be a non-transitory tangible media.

In some examples, the communication device 506 may include a modem, network card, or any other device to enable the computing system 500 to communicate with other computing devices. In some examples, any computing device represents a plurality of interconnected (whether by intranet or Internet) computer systems, including without limitation, personal computers, mainframes, PDAs, smartphones and cell phones.

A computing system such as the computing system 500 typically includes at least hardware capable of executing machine readable instructions, as well as the software for executing acts (typically machine-readable instructions) that produce a desired result. In some examples, a computing system may include hybrids of hardware and software, as well as computer sub-systems.

In some examples, hardware generally includes at least processor-capable platforms, such as hand-held processing devices (such as smart phones, tablet computers, personal digital assistants (PDAs), or personal computing devices (PCDs), for example. In some examples, hardware may include any physical device that is capable of storing machine-readable instructions, such as memory or other data storage devices. In some examples, other forms of hardware include hardware sub-systems, including transfer devices such as modems, modem cards, ports, and port cards, for example.

In some examples, software includes any machine code stored in any memory medium, such as RAM or ROM, and machine code stored on other devices (such as floppy disks, flash memory, or a CD ROM, for example). In some examples, software may include source or object code. In several exemplary embodiments, software encompasses any set of instructions capable of being executed on a computing device such as, for example, on a client machine or server.

In some examples, combinations of software and hardware could also be used for providing enhanced functionality and performance for certain embodiments of the present disclosure. In some examples, software functions may be directly manufactured into an integrated circuit. Accordingly, it should be understood that combinations of hardware and software are also included within the definition of a computer system and are thus envisioned by the present disclosure as possible equivalent structures and equivalent methods.

In some examples, computer readable mediums include, for example, passive data storage, such as a random access memory (RAM) as well as semi-permanent data storage such as a solid state drive. One or more exemplary embodiments of the present disclosure may be embodied in the RAM of a computing device to transform a standard computer into a new specific computing machine. In some examples, data structures are defined organizations of data that may enable an embodiment of the present disclosure. In an exemplary embodiment, a data structure may provide an organization of data, or an organization of executable code.

In some examples, a network and/or one or more portions thereof may be designed to work on any specific architecture. In some examples, one or more portions of the network may be executed on a single computer, local area networks, client-server networks, wide area networks, internets, hand-held and other portable and wireless devices and networks.

In some examples, a database may be any standard or proprietary database software, such as Oracle, Microsoft Access, SyBase, or DBase II, for example. The database may have fields, records, data, and other database elements that may be associated through database specific software. In several exemplary embodiments, data may be mapped. In some examples, mapping is the process of associating one data entry with another data entry. In an exemplary embodiment, the data contained in the location of a character file can be mapped to a field in a second table. In some examples, the physical location of the database is not limiting, and the database may be distributed. In some examples, the database may exist remotely from the server, and run on a separate platform. In some examples, the database may be accessible across the Internet. In several exemplary embodiments, more than one database may be implemented.

In some examples, a computer program, such as a plurality of instructions stored on a computer readable medium, such as the computer readable medium, the system memory 504, and/or any combination thereof, may be executed by a processor 502 to cause the processor 502 to carry out or implement in whole or in part the operation of the computing system 500, one or more of the methods. In some examples, such a processor 502 may execute the plurality of instructions in connection with a virtual computer system.

Some examples of processing systems described herein may include non-transitory, tangible, machine readable media that include executable code that when run by one or more processors (e.g., processor 502) may cause the one or more processors to perform the processes of methods as described above. Some common forms of machine readable media that may include the processes of methods for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method performed by a computing system, the method comprising:
   detecting that a removable data volume has been attached to the computing system, the removable data volume being identified by a unique label;
   in response to determining that a portion of the unique label matches a predefined value searching a rule database for a device manager rule associated with the unique label;
   invoking a catalog container based on the device manager rule, the catalog container including a first application for examining metadata stored on the removable data volume;
   with the catalog container, examining, using the first application, metadata stored on the removable data volume, to identify a second application having characteristics for processing a first piece of data stored on the removable data volume;
   with the catalog container, searching a public container database for an application container comprising the second application;
   responsive to identifying the application container comprising the second application, causing the application container to be loaded into a runtime environment having runtime environment characteristics identified by the characteristics in the metadata; and
   with the application container, accessing, using the second application, the first piece of data stored on the removable data volume.

2. The method of claim 1, wherein the catalog container is published within the public container database.

3. The method of claim 2, wherein invoking the catalog container comprises loading the catalog container onto the computing system from the public container database.

4. The method of claim 1, wherein the rule database is in communication with the computing system.

5. The method of claim 1, wherein the metadata includes a name of the second application.

6. The method of claim 1, wherein the metadata includes a version of the second application.

7. The method of claim 1, wherein the metadata includes a configuration of a runtime environment for the second application.

8. The method of claim 1, wherein the metadata includes resources required by the second application.

9. The method of claim 1, wherein the metadata further includes characteristics of a third application associated with a second piece of data that is stored on the removable data volume.

10. The method of claim 8, wherein the application container further includes the third application with the characteristics of the second application.

11. The method of claim 1, further comprising, detecting that a second removable data volume has been connected to the computing system, the second removable data volume storing metadata that indicates at least one different application and a second set of characteristics for the at least one different application associated with at least one piece of data on the second removable data volume.

12. The method of claim 11, further comprising, loading a second application container to process the second removable data volume, the second application container including the at least one different application having the second set of characteristics.

13. A computing system comprising:
    a hardware processor; and
    a memory comprising machine readable instructions that when executed by the hardware processor cause the hardware processor to:
    detect that a removable data volume has been attached to the computing system, the removable data volume being identified by a unique label;
    in response to determining that a portion of the unique label matches a predefined value, search a rule database for a device manager rule associated with the unique label;
    invoke a catalog container based on the device manager rule, the catalog container including a first application for examining metadata stored on the removable data volume;
    with the catalog container, examine, using the first application, metadata stored on the removable data volume, to identify a second application having characteristics for processing a first piece of data stored on the removable data volume;
    with the catalog container, search a public container database for an application container comprising the second application;
    responsive to identifying the application container comprising the second application, cause the application container having the first application to be loaded into a runtime environment having runtime environment characteristics identified by the characteristics in the metadata; and
    with the application container, access, using the second application, the first piece of data stored on the removable data volume.

14. The system of claim 13, wherein the catalog container is published within the public container database.

15. The system of claim 14, wherein the application container is published into the public container database.

16. The system of claim 14, wherein the application container is configured to find an additional application container within the public container database and cause the additional application container to be loaded on the computing system.

17. The system of claim 13, wherein the metadata includes at least one of: a name of the second application, a version of the second application, a configuration of a runtime environment for the second application, system requirements for the second application.

18. The system of claim 13, wherein the metadata further includes characteristics of a third application associated with a second piece of data that is stored on the removable data volume.

19. The system of claim 13, wherein the application container further includes the third application with the characteristics of the second application.

\* \* \* \* \*